(12) United States Patent
Namekawa

(10) Patent No.: US 9,611,796 B2
(45) Date of Patent: Apr. 4, 2017

(54) CONTROL APPARATUS FOR DIRECT INJECTION ENGINE

(71) Applicant: Fuji Jukogyo Kabushiki Kaisha, Tokyo (JP)

(72) Inventor: Yoshitaka Namekawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/042,047

(22) Filed: Feb. 11, 2016

(65) Prior Publication Data
US 2016/0273476 A1 Sep. 22, 2016

(30) Foreign Application Priority Data

Mar. 17, 2015 (JP) ................................. 2015-053716

(51) Int. Cl.
*F02D 41/06* (2006.01)
*F02D 41/30* (2006.01)
(Continued)

(52) U.S. Cl.
CPC ........... *F02D 41/062* (2013.01); *F02D 41/40* (2013.01); *F02D 41/3845* (2013.01);
(Continued)

(58) Field of Classification Search
CPC .... F02D 41/062; F02D 41/40; F02D 41/3845; F02D 41/3076; F02D 41/401;
(Continued)

(56) References Cited

U.S. PATENT DOCUMENTS

2001/0023683 A1* 9/2001 Nakamura ............ F02D 41/042
123/457
2001/0025621 A1* 10/2001 Shiraishi ............... B60W 10/06
123/305
(Continued)

FOREIGN PATENT DOCUMENTS

JP    H11-044236 A    2/1999
JP    2001-342873 A    12/2001
(Continued)

OTHER PUBLICATIONS

JPO Decision to Grant dated Jul. 5, 2016.

*Primary Examiner* — Lindsay Low
*Assistant Examiner* — George Jin
(74) *Attorney, Agent, or Firm* — McGinn IP Law Group, PLLC

(57) ABSTRACT

A cylinder-injection-engine control apparatus includes a fuel injection controller that executes air purge control for performing fuel injection in an intake stroke if fuel pressure is below a predetermined pressure when an engine starts. When executing the air purge control, the fuel injection controller makes a fuel injection time of an injector longer than when the fuel pressure is higher than or equal to the predetermined pressure. When executing the air purge control, if the amount of fuel in a fuel tank is larger than or equal to a predetermined amount and an integrated value of a fuel injection amount (integrated injection amount) since start of the fuel injection is larger than or equal to a predetermined value, the fuel injection controller stops the air purge control.

20 Claims, 5 Drawing Sheets

(51) Int. Cl.
*F02D 41/40* (2006.01)
*F02D 41/38* (2006.01)

(52) U.S. Cl.
CPC ............... *F02D 2041/389* (2013.01); *F02D 2200/0602* (2013.01); *F02D 2200/0616* (2013.01); *F02D 2250/02* (2013.01)

(58) Field of Classification Search
CPC ............ F02D 41/3818; F02D 2250/02; F02D 2200/0606; F02D 2200/0616; F02D 2200/0602; F02D 2200/0614; F02D 2041/389; F02M 37/20
USPC ............................................ 123/179.7, 179.6
See application file for complete search history.

(56) References Cited

U.S. PATENT DOCUMENTS

| | | | | |
|---|---|---|---|---|
| 2006/0231080 | A1* | 10/2006 | Tomatsuri | F02D 41/062 123/516 |
| 2010/0212640 | A1* | 8/2010 | Lucido | F02D 41/062 123/516 |
| 2015/0260121 | A1* | 9/2015 | Courtiel | F02D 41/064 123/295 |

FOREIGN PATENT DOCUMENTS

| | | |
|---|---|---|
| JP | 2003-120460 A | 4/2003 |
| JP | 2003-166435 A | 6/2003 |
| JP | 2007-71095 A | 3/2007 |
| JP | 2009-185662 A | 8/2009 |

\* cited by examiner

CONTROL APPARATUS FOR DIRECT INJECTION ENGINE

CROSS-REFERENCE TO RELATED APPLICATIONS

The present application claims priority from Japanese Patent Application No. 2015-053716 filed on Mar. 17, 2015, the entire contents of which are hereby incorporated by reference.

BACKGROUND

1. Technical Field

The present invention relates to control apparatuses for a direct injection engine that directly inject fuel into cylinders of engines.

2. Related Art

In recent years, direct injection engines have been widely put to practical use. Such a direct injection engine can achieve, for instance, improved charging efficiency and improved antiknock properties by directly injecting fuel into the cylinders of the engine. Because such a direct injection engine needs to directly inject fuel into combustion chambers that have become in a high pressure state in the compression stroke, the pressure of fuel (which may be referred to as "fuel pressure" hereinafter) to be fed to injectors is increased by using a high-pressure fuel pump.

Furthermore, in a direct injection engine, when the engine is to be started, the fuel injection timing is controlled so that the fuel is injected in the compression stroke in view of the starting performance and exhaust gas emission (for instance, see Japanese Unexamined Patent Application Publication No. 2007-71095).

SUMMARY OF THE INVENTION

For instance, when manufacturing an engine (i.e., when manufacturing a vehicle) as well as when replacing a component of a fuel feed system, such as the high-pressure fuel pump or a fuel pipe, air may become mixed in the fuel feed system. Therefore, when starting the engine at the end of a line (i.e., in a line inspection process) or when starting the engine after replacing a component, a pressurization failure of fuel pressure may occur due to inclusion of air, possibly causing the engine to become incapable of starting.

It is desirable to provide a control apparatus for a direct injection engine that can prevent an engine from being incapable of starting even if a pressurization failure of fuel pressure occurs due to inclusion of air when starting the engine.

An aspect of the present invention provides a control apparatus for a direct injection engine that includes a fuel pressure detector that detects fuel pressure of fuel to be fed to at least one injector that injects the fuel into a corresponding cylinder of the engine, and a fuel injection controller that executes air purge control for performing fuel injection in an intake stroke of the engine if the fuel pressure detected by the fuel pressure detector is below a predetermined pressure when the engine starts.

When executing the air purge control, the fuel injection controller may make a fuel injection time of the injector longer than when the fuel pressure is higher than or equal to the predetermined pressure.

When executing the air purge control, the fuel injection controller may perform a single injection process in the intake stroke.

If the fuel pressure falls below the predetermined pressure after the engine is cranked and transitions from initial explosion to complete explosion, the fuel injection controller may execute the air purge control.

The control apparatus for a direct injection engine may further include a fuel amount detector that detects an amount of fuel retained in a fuel tank, and an integrator that integrates a fuel injection amount since start of the fuel injection. When executing the air purge control, if the amount of fuel detected by the fuel amount detector is larger than or equal to a predetermined amount and an integrated value of the fuel injection amount integrated by the integrator is larger than or equal to a predetermined value, the fuel injection controller may stop the air purge control.

The predetermined value may be set in accordance with a capacity of components and pipes constituting a fuel feed system from a low-pressure fuel pump, which suctions up the fuel retained in the fuel tank, to the injector, which injects the fuel into the cylinder.

When executing the air purge control, if a state where a difference between an actual fuel pressure detected by the fuel pressure detector and a fuel-pressure control target value is within a predetermined tolerance continues for a predetermined time or longer, the fuel injection controller may stop the air purge control.

DETAILED DESCRIPTION

Figure 1:
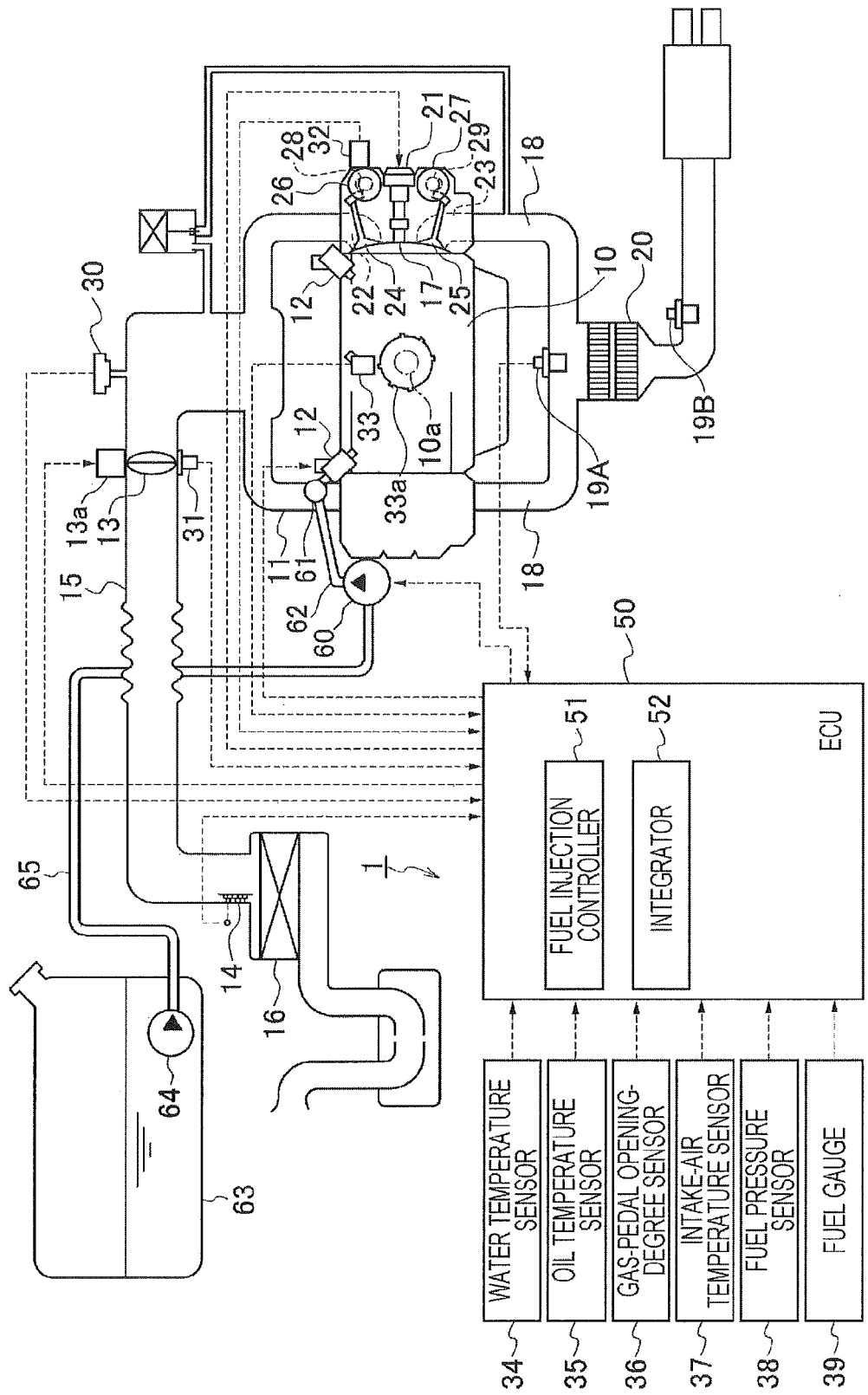
FIG. 1 illustrates the configuration of a control apparatus for a direct injection engine according to an example and the configuration of a direct injection engine to which the control apparatus is applied.

A preferred example of the present invention will be described in detail below with reference to the drawings. In the drawings, identical or equivalent sections will be given the same reference signs. Moreover, in the drawings, identical components will be given the same reference signs, and redundant descriptions thereof will be omitted.

First, the configuration of a control apparatus 1 for a direct injection engine according to an example and the configuration of a direct injection engine 10 to which the control apparatus 1 is applied will be described with reference to FIG. 1. FIG. 1 illustrates the configuration of the control apparatus 1 and the configuration of the direct injection engine (which may be simply referred to as "engine" hereinafter) 10 to which the control apparatus 1 is applied.

The engine 10 is, for instance, a four-cylinder gasoline engine of a horizontally opposed type. Furthermore, the engine 10 is a direct injection engine that directly injects fuel into the cylinders. In the engine 10, air taken in through an air cleaner 16 is throttled by an electronically-controlled throttle valve (which may simply be referred to as "throttle valve" hereinafter) 13 provided in an intake pipe 15, travels through an intake manifold 11, and is taken into the cylinders formed in the engine 10. The amount of air taken in through the air cleaner 16 (i.e., the amount of air to be taken into the engine 10) is detected by an airflow meter 14 disposed between the air cleaner 16 and the throttle valve 13. A vacuum sensor 30 that detects the pressure within the intake manifold 11 is disposed inside a collector (surge tank) that constitutes the intake manifold 11. Furthermore, the throttle valve 13 is provided with a throttle opening-degree sensor 31 that detects the degree of opening of the throttle valve 13.

A cylinder head has an intake port 22 and an exhaust port 23 for each cylinder (only one of the banks is illustrated in FIG. 1). The intake ports 22 and the exhaust ports 23 are respectively provided with intake valves 24 and exhaust valves 25 that open and close the intake ports 22 and the exhaust ports 23. A variable valve-timing mechanism 26 is provided between an intake camshaft 28 and an intake cam pulley that drive each intake valve 24. The variable valve-timing mechanism 26 successively changes the rotational phase (displacement angle) of the intake camshaft 28 relative to a crankshaft 10a by relatively rotating the intake cam pulley and the intake camshaft 28 so as to advance or retard the valve timing (opening-closing timing) of each intake valve 24. The variable valve-timing mechanism 26 variably sets the opening-closing timing of each intake valve 24 in accordance with the engine running state.

Likewise, a variable valve-timing mechanism 27 is provided between an exhaust camshaft 29 and an exhaust cam pulley. The variable valve-timing mechanism 27 successively changes the rotational phase (displacement angle) of the exhaust camshaft 29 relative to the crankshaft 10a by relatively rotating the exhaust cam pulley and the exhaust camshaft 29 so as to advance or retard the valve timing (opening-closing timing) of each exhaust valve 25. The variable valve-timing mechanism 27 variably sets the opening-closing timing of each exhaust valve 25 in accordance with the engine running state.

Injectors 12 that inject fuel into the cylinders of the engine 10 are attached to the respective cylinders. The injectors 12 directly inject fuel pressurized by a high-pressure fuel pump 60 into combustion chambers of the cylinders.

The injectors 12 are connected to a delivery pipe (common rail) 61. The delivery pipe 61 distributes the fuel pressure-fed from the high-pressure fuel pump 60 via a high-pressure fuel pipe 62 to the injectors 12. The high-pressure fuel pump 60 pressurizes the fuel suctioned up from a fuel tank 63 by a feed pump (low-pressure fuel pump) 64 and fed via a low-pressure fuel pipe 65 to a high pressure (e.g., 8 MPa to 13 MPa) and feeds the fuel to the delivery pipe 61. In this example, the high-pressure fuel pump 60 used is of a type that is driven by the intake camshaft 28 of the engine 10.

The configuration of the high-pressure fuel pump 60 will be described here with reference to FIG. 2. The high-pressure fuel pump 60 mainly has a pump driving cam 601, a lifter 602, a plunger 603, an electromagnetic valve 606 that controls an inlet valve 605, and an outlet valve 607. The pump driving cam 601 is driven by rotational driving force of the intake camshaft 28 of the engine 10 and causes the lifter 602 and the plunger 603 to reciprocate. When the plunger 603 descends, the inlet valve 605 is opened, thus causing the fuel to flow into a pressurizing chamber 604. When the plunger 603 ascends, the inlet valve 605 becomes closed, so that the fuel in the pressurizing chamber 604 becomes compressed. This pressure causes the outlet valve 607 to open, so that the high-pressure fuel is discharged.

Figure 2:
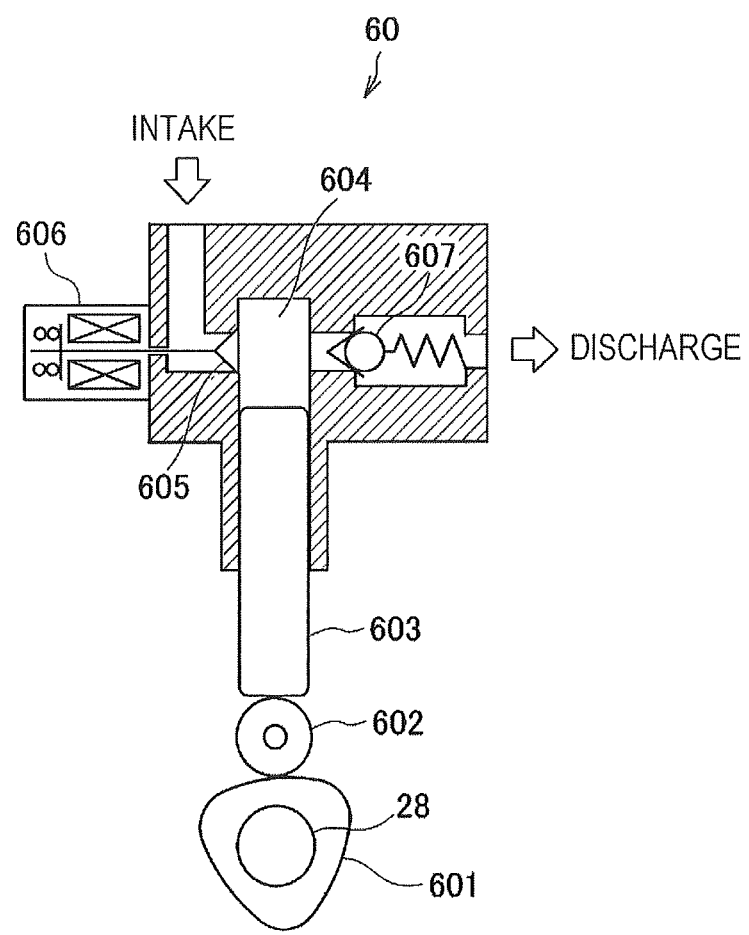
FIG. 2 is a vertical sectional view schematically illustrating an example of a high-pressure fuel pump.

As illustrated in FIG. 2, the pump driving cam 601 has three cam lobes formed at an equal pitch in the rotational direction of the intake camshaft 28. Since the intake camshaft 28 rotates once while the crankshaft 10a makes two rotations, the plunger 603 reciprocates three times relative to two rotations of the crankshaft 10a, and the fuel is discharged from the high-pressure fuel pump 60.

The inlet valve 605 has a structure such that the closing operation thereof can be electrically controlled by the electromagnetic valve 606. With regard to the fuel flowing into the pressurizing chamber 604 during the descending of the plunger 603, the fuel is returned toward the intake side if the inlet valve 605 is maintained in an open state when the plunger 603 ascends, or is pressurized within the pressurizing chamber 604 and is discharged if the inlet valve 605 is closed when the plunger 603 ascends. By controlling the closing timing of the inlet valve 605 during the ascending of the plunger 603 so as to change the ratio of the fuel to be returned toward the intake side to the fuel to be pressurized, the flow of high-pressure fuel to be discharged can be controlled. The electromagnetic valve 606 is connected to an engine control unit (referred to as "ECU" hereinafter) 50, which will be described later, and the driving of the electromagnetic valve 606 is controlled by the ECU 50.

Referring back to FIG. 1, ignition plugs 17 that ignite an air-fuel mixture and igniter-containing coils 21 that apply high voltage to the ignition plugs 17 are attached to the cylinder head of the cylinders. In each cylinder of the engine 10, an air-fuel mixture containing the intake air and the fuel injected by the corresponding injector 12 is combusted by being ignited by the corresponding ignition plug 17. After combustion, exhaust gas is exhausted via an exhaust pipe 18.

An air-fuel ratio sensor 19A that outputs a signal according to the oxygen concentration in the exhaust gas is attached to the exhaust pipe 18. The air-fuel ratio sensor 19A used is a linear air-fuel ratio sensor (LAF sensor) that can linearly detect an exhaust-gas air-fuel ratio. Alternatively, the air-fuel ratio sensor 19A used may be an $O_2$ sensor that detects the exhaust-gas air-fuel ratio in an on-off manner.

An exhaust-gas purification catalyst (CAT) 20 is provided downstream of the air-fuel ratio sensor 19A. The exhaust-gas purification catalyst 20 is a three-way catalyst that simultaneously performs oxidation of hydrocarbon (HC) and carbon monoxide (CO) within the exhaust gas and reduction of nitrogen oxide ($NO_x$) and that purifies harmful gas components within the exhaust gas into carbon dioxide ($CO_2$), water vapor ($H_2O$), and nitrogen ($N_2$), which are harmless. A rear (post-CAT) $O_2$ sensor 19B that detects the exhaust-gas air-fuel ratio in an on-off manner is provided downstream of the exhaust-gas purification catalyst 20.

In addition to the airflow meter 14, the LAF sensor 19A, the $O_2$ sensor 19B, the vacuum sensor 30, and the throttle opening-degree sensor 31 described above, a cam angle sensor 32 for differentiating among the cylinders of the engine 10 is attached near the intake camshaft 28 of the engine 10. The cam angle sensor 32 outputs an electric signal expressing the rotational position of the intake camshaft 28 and also outputs an electric signal expressing the rotational position of the pump driving cam 601 of the high-pressure fuel pump 60, which rotates in accordance with the rotation of the intake camshaft 28.

Furthermore, a crank angle sensor 33 that detects the rotational position of the crankshaft 10a is attached near the crankshaft 10a of the engine 10. For instance, a timing rotor 33a having 34 protrusions at a 10° pitch with a lack of two protrusions is attached to an end of the crankshaft 10a. The crank angle sensor 33 detects the presence and absence of the protrusions of the timing rotor 33a so as to detect the rotational position of the crankshaft 10a. For instance, the cam angle sensor 32 and the crank angle sensor 33 used are of an electromagnetic pickup type.

These sensors are connected to the ECU 50. The ECU 50 is also connected to various types of sensors, such as a water temperature sensor 34 that detects the temperature of a coolant in the engine 10, an oil temperature sensor 35 that detects the temperature of a lubricant, a gas-pedal opening-degree sensor 36 that detects the amount by which a gas pedal is pressed, that is, the degree of opening (operation amount) of the gas pedal, and an intake-air temperature sensor 37 that detects the temperature of intake air. Moreover, for instance, the ECU 50 has the delivery pipe 61 attached thereto, and is connected to a fuel pressure sensor 38 that detects the pressure of fuel to be fed to the injectors 12 (i.e., the pressure of fuel pressurized by the high-pressure fuel pump 60) and a fuel gauge 39 that detects the amount of fuel (fuel level) retained in the fuel tank 63. In one example, the fuel pressure sensor 38 may serve as a "fuel pressure detector", and the fuel gauge 39 may serve as a "fuel amount detector". For instance, the fuel gauge 39 used may be of a type that has an arm attached to a floating member floating in the fuel tank 63 and that detects the position of the floating member (i.e., the amount of fuel) as a change in electric resistance. Alternatively, for instance, the fuel gauge 39 used may be a capacitance sensor.

The ECU 50 has, for instance, a microprocessor that performs calculation, a read-only memory (ROM) that stores a program for causing the microprocessor to execute processes, a random access memory (RAM) that stores various kinds of data, such as a calculation result, a backup RAM in which the stored contents are retained by a 12-V battery, and an input-output interface (I/F). The ECU 50 also includes, for instance, an injector driver that drives the injectors 12, an output circuit that outputs an ignition signal, and a motor driver that drives an electric motor 13a that opens and closes the electronically-controlled throttle valve 13. Moreover, the ECU 50 includes, for instance, a driver that drives the electromagnetic valve 606 constituting the high-pressure fuel pump 60.

The ECU 50 differentiates among the cylinders based on an output from the cam angle sensor 32 and determines the engine speed based on an output from the crank angle sensor 33. Furthermore, based on detection signals input from the aforementioned various types of sensors, the ECU 50 acquires various kinds of information, such as the amount of intake air, the negative pressure in the intake pipe 15, the degree of opening of the gas pedal, the air-fuel ratio of the air-fuel mixture, the temperature of the intake air, and the water temperature and the oil temperature in the engine 10. Then, based on these various kinds of acquired information, the ECU 50 controls the entire engine 10 by controlling the fuel injection amount, the fuel injection timing, the injection timing, and the various types of devices, such as the throttle valve 13.

In particular, the ECU 50 has a function of preventing the engine 10 from being incapable of starting even if a pressurization failure of fuel pressure occurs due to inclusion of air when starting the engine 10. Therefore, the ECU 50 functionally includes a fuel injection controller 51 and an integrator 52. In the ECU 50, the program stored in the ROM is executed by the microprocessor so that the functions of the fuel injection controller 51 and the integrator 52 are realized.

When the engine 10 is to be cranked and started, if the fuel pressure detected by the fuel pressure sensor 38 is below a predetermined pressure (i.e., if a pressurization failure occurs), the fuel injection controller 51 executes air purge control for performing fuel injection in the intake stroke of the engine 10, in which the pressure in the cylinders is low. When starting the engine 10, if the fuel pressure is higher than or equal to the predetermined pressure (i.e., if the fuel pressure is properly increased), the fuel injection controller 51 executes fuel injection control based on a normal mode, that is, fuel injection in the compression stroke.

When the fuel injection controller 51 is executing air purge control, the fuel injection controller 51 controls the driving of the injectors 12 to set the fuel injection time longer than that when the fuel pressure is higher than or equal to the predetermined pressure (i.e., in a case of normal control) so as to prevent a lean air-fuel ratio and also to facilitate purging of mixed air. In that case, the fuel injection controller 51 preferably performs a single injection process in the intake stroke (i.e., inject the fuel in a single valve-opening process instead of injecting the fuel multiple times in a divisional manner).

Furthermore, even after the engine 10 is cranked and transitions from initial explosion to complete explosion, the fuel injection controller 51 executes the aforementioned air purge control if the fuel pressure falls below the predetermined pressure. This prevents the engine 10 from stalling after complete explosion.

When cranking starts, the integrator 52 integrates the fuel injection amount since the start of fuel injection by the injectors 12 so as to calculate an integrated injection amount. Specifically, the integrator 52 calculates the integrated injection amount based on, for instance, an injection pulse width (i.e., the open time of the injectors 12) to be applied to the injectors 12, the fuel pressure, and the number of fuel injection processes. The integrated injection amount calculated by the integrator 52 is output to the aforementioned fuel injection controller 51.

When executing air purge control, if the amount of fuel detected by the fuel gauge 39 (i.e., the amount of fuel retained in the fuel tank 63) is higher than or equal to a predetermined amount (i.e., if the feed pump 64 is not in a state where it is incapable of suctioning up the fuel (so-called out-of-gas state)) and also if the integrated injection amount calculated by the integrator 52 is larger than or equal to a predetermined value, the fuel injection controller 51 determines that the air has been purged and stops (terminates) the air purge control. Subsequently, the fuel injection controller 51 executes fuel injection control based on the normal mode, that is, executes fuel injection in the compression stroke.

The predetermined value mentioned above is preferably set in accordance with the capacity (which may be referred to as "fuel pipe capacity" hereinafter) of the components and pipes constituting the fuel feed system from the feed pump (low-pressure fuel pump) 64, which suctions up the fuel retained in the fuel tank 63, to the injectors 12. Specifically, the components and pipes constituting the fuel feed system include the feed pump 64, the low-pressure fuel pipe 65, the high-pressure fuel pump 60, the high-pressure fuel pipe 62, the delivery pipe 61, and the injectors 12.

Furthermore, when executing air purge control, if a state where a difference between the fuel pressure actually detected by the fuel pressure sensor 38 (which may be referred to as "actual fuel pressure" hereinafter) and a fuel-pressure control target value (which may be referred to as "target fuel pressure" hereinafter) set based on the engine running state is within a predetermined tolerance (i.e., a control tolerance of fuel pressure feedback of the high-pressure fuel pump 60) continues for a predetermined time or longer (e.g., about a dozen or so seconds), the fuel injection controller 51 stops (terminates) the air purge control. Subsequently, the fuel injection controller 51 executes fuel injection control based on the normal mode, that is, executes fuel injection in the compression stroke.

Figure 3:
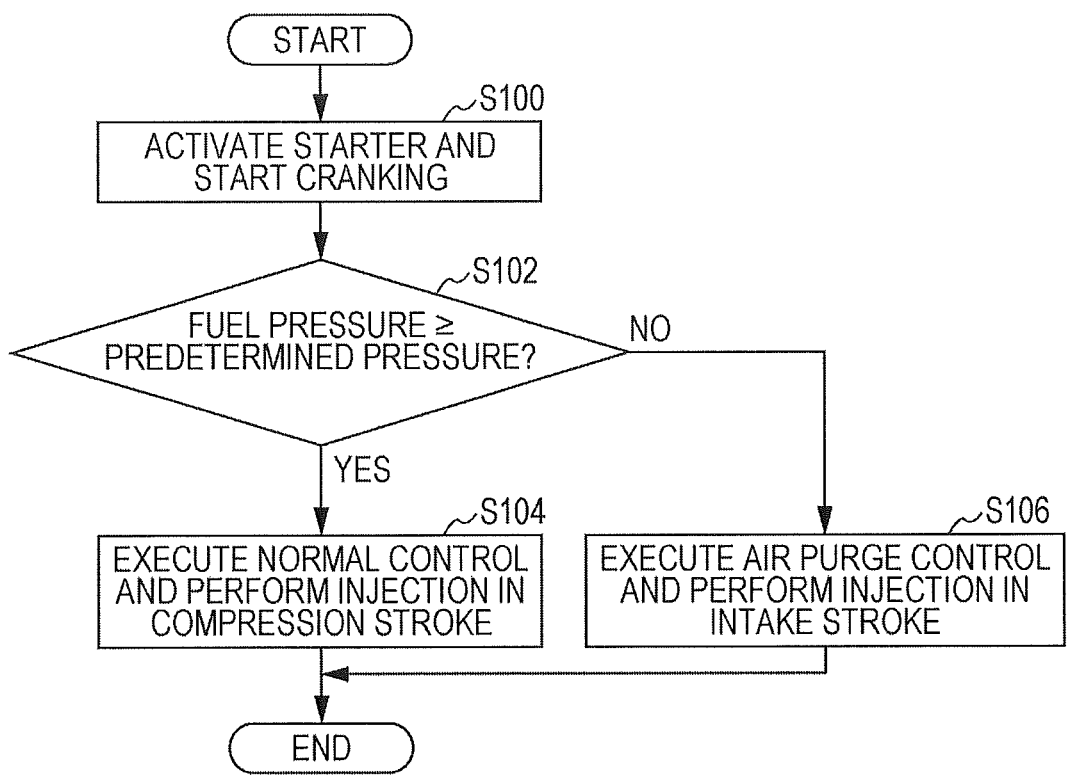
FIG. 3 is a flowchart illustrating a procedure of air purge control (i.e., a process for determining whether to execute air purge control during cranking) performed by the control apparatus for a direct injection engine according to the example.
Figure 4:
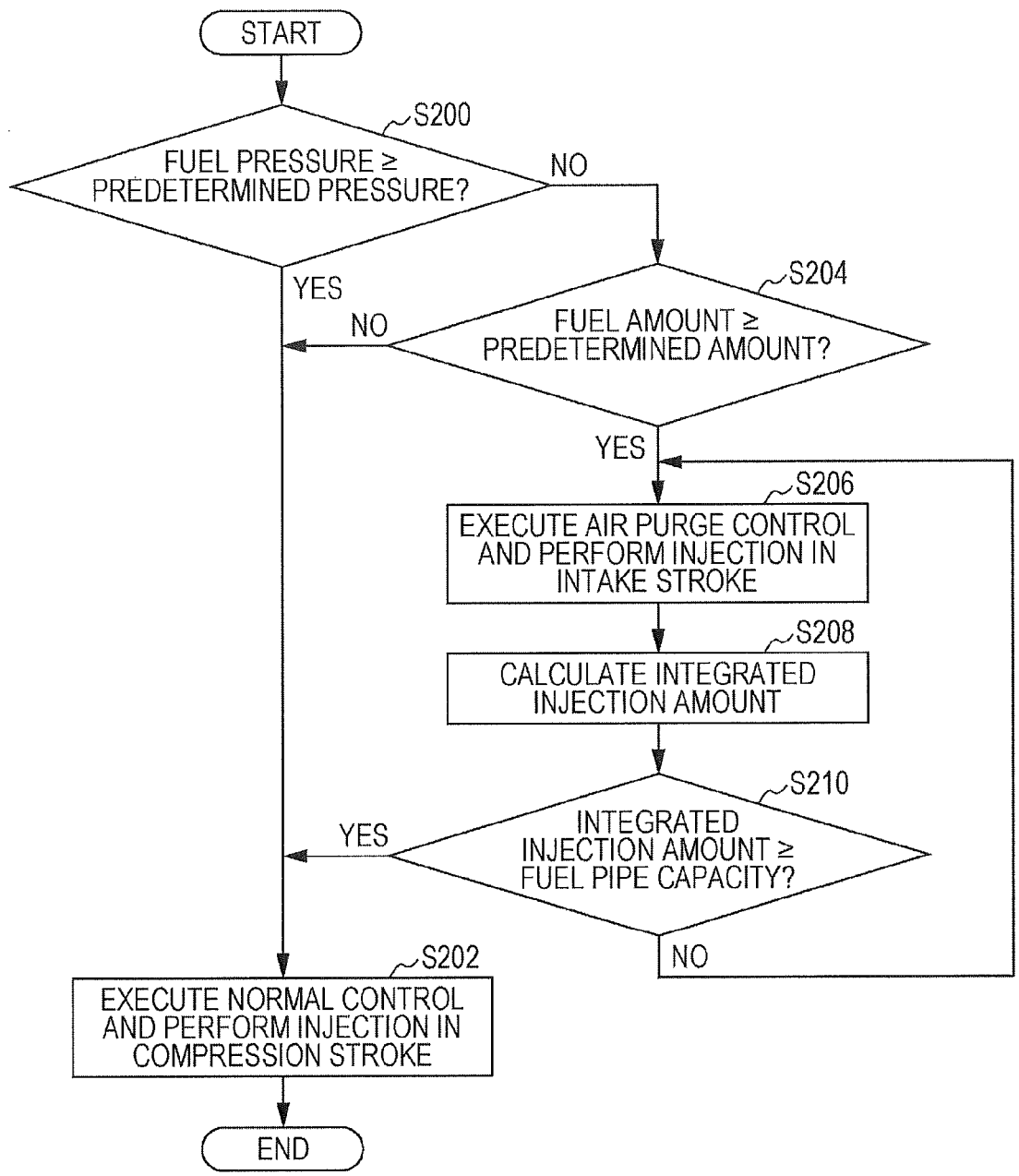
FIG. 4 is a flowchart illustrating a procedure of air purge control (i.e., a process for determining whether to execute air purge control after complete explosion and a process for determining whether to stop the air purge control after complete explosion) performed by the control apparatus for a direct injection engine according to the example.
Figure 5:
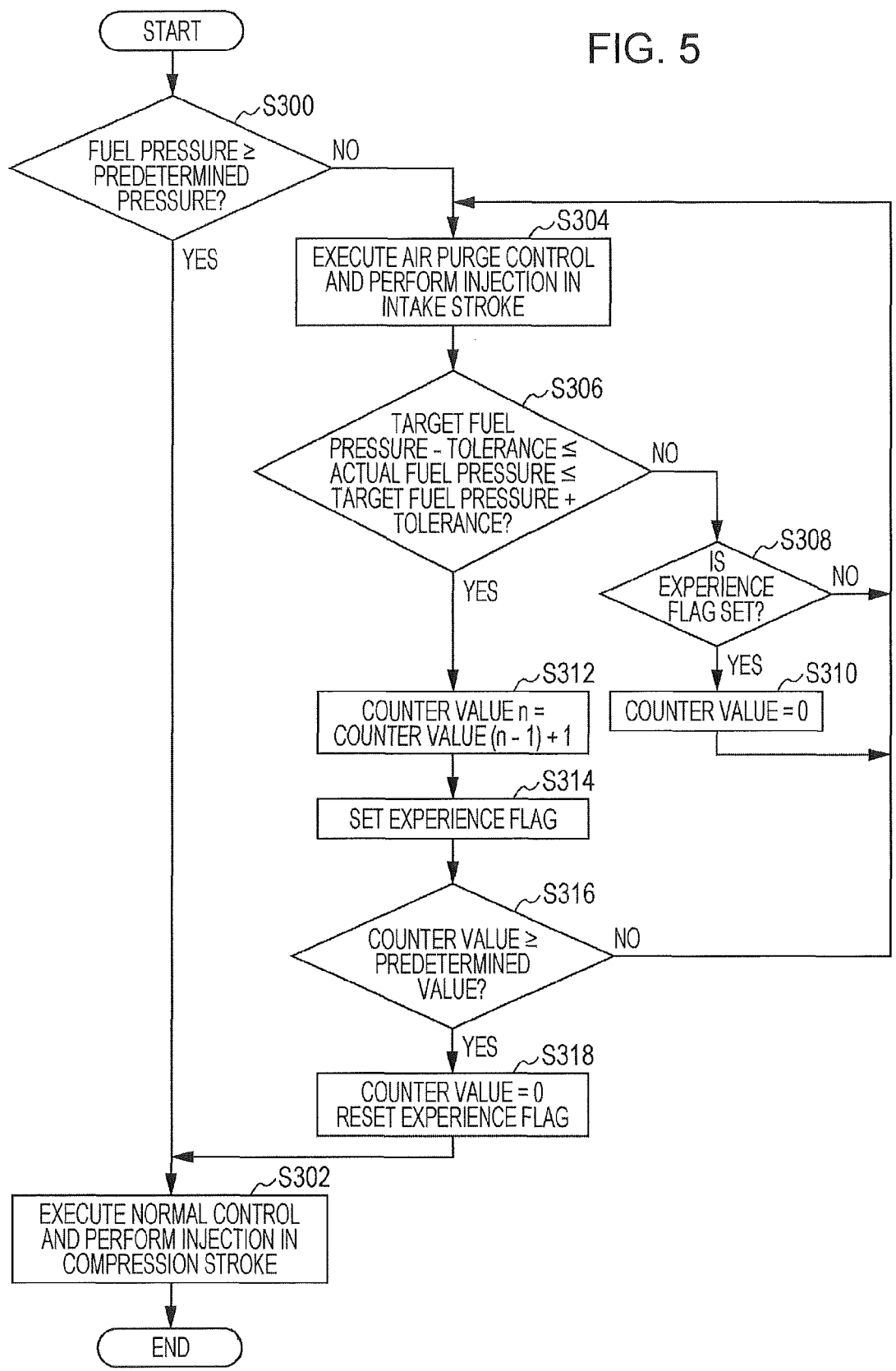
FIG. 5 is a flowchart illustrating a procedure of air purge control (i.e., a process for determining whether to execute air purge control after complete explosion and a process for determining whether to stop the air purge control after complete explosion) performed by the control apparatus according to the example.

Next, the operation of the control apparatus 1 will be described with reference to FIGS. 3 to 5. FIG. 3 is a flowchart illustrating a procedure of air purge control (i.e., a process for determining whether to execute air purge control during cranking) performed by the control apparatus 1. FIG. 4 is a flowchart illustrating a procedure of air purge control (i.e., a process for determining whether to execute air purge control after complete explosion and a process for determining whether to stop the air purge control after complete explosion (stoppage determination based on the integrated injection amount and the fuel pipe capacity)) performed by the control apparatus 1. FIG. 5 is a flowchart illustrating a procedure of air purge control (i.e., a process for determining whether to execute air purge control after complete explosion and a process for determining whether to stop the air purge control after complete explosion (stoppage determination based on the fuel-pressure control state of the high-pressure fuel pump 60)) performed by the control apparatus 1. These processes are repeatedly executed in the ECU 50 at predetermined timings.

First, air purge control (i.e., a process for determining whether to execute air purge control during cranking) performed by the control apparatus 1 will be described with reference to FIG. 3.

In step S100, a starter (not shown) is activated so as to start cranking. Thus, the engine 10 is driven and rotated, and the fuel is pressurized by the high-pressure fuel pump 60.

Then, in step S102, it is determined whether or not the fuel pressure is higher than or equal to a predetermined pressure. If the fuel pressure is higher than or equal to the predetermined pressure (i.e., if the fuel pressure is properly increased), the process proceeds to step S104. If the fuel pressure is below the predetermined pressure (i.e., if a pressurization failure occurs), the process proceeds to step S106.

In step S104, normal fuel injection in the compression stroke is executed, and the engine 10 is started. Subsequently, this process temporarily ends.

On the other hand, in step S106, air purge control is executed. Specifically, fuel is injected in the intake stroke in which the cylinder pressure is low. In that case, the fuel injection pulse width to be applied to the injectors 12 is expanded so that the fuel injection time of the injectors 12 is made longer than that in normal operation (i.e., when the fuel pressure is higher than or equal to the predetermined pressure), thereby preventing a lean air-fuel ratio and also facilitating air purging. Consequently, the engine 10 is started. Subsequently, this process temporarily ends.

Next, air purge control (i.e., a process for determining whether to execute air purge control after complete explosion and a process for determining whether to stop the air purge control after complete explosion (stoppage determination based on the integrated injection amount and the fuel pipe capacity)) performed by the control apparatus 1 will be described with reference to FIG. 4. This process is executed after the engine 10 is cranked and transitions from initial explosion to complete explosion.

In step S200, it is determined whether or not the fuel pressure is higher than or equal to a predetermined pressure. If the fuel pressure is higher than or equal to the predetermined pressure (i.e., if the fuel pressure is properly increased), the process proceeds to step S202. If the fuel pressure is below the predetermined pressure (i.e., if a pressurization failure occurs), the process proceeds to step S204.

In step S202, fuel injection based on the normal mode, that is, fuel injection in the compression stroke, is executed. Subsequently, this process temporarily ends.

In step S204, it is determined whether or not the fuel amount (fuel level) in the fuel tank 63 is larger than or equal to a predetermined amount. If the fuel amount is larger than or equal to the predetermined amount, the process proceeds to step S206. If the fuel amount is smaller than the predetermined amount (i.e., so-called out-of-gas state), the process proceeds to step S202 described above where fuel injection based on the normal mode, that is, fuel injection in the compression stroke, is executed. Subsequently, this process temporarily ends.

In step S206, air purge control is executed. Specifically, fuel is injected in the intake stroke in which the cylinder pressure is low. In this case, the fuel injection pulse width to be applied to the injectors 12 is expanded so that the fuel injection time of the injectors 12 is made longer than that in normal operation (i.e., when the fuel pressure is higher than or equal to the predetermined pressure).

Subsequently, in step S208, the fuel injection amount is integrated so that an integrated injection amount since the start of fuel injection is calculated. Because the method of calculating an integrated injection amount has already been described above, a detailed description thereof will be omitted here.

Subsequently, in step S210, it is determined whether or not the integrated injection amount calculated in step S208 is larger than or equal to the fuel pipe capacity (i.e., whether or not air has been completely purged). If the integrated injection amount is smaller than the fuel pipe capacity, the process proceeds to step S206, and the process from step S206 to step S210 (air purge control) described above is repeated until the integrated injection amount becomes higher than or equal to the fuel pipe capacity.

On the other hand, if the integrated injection amount is higher than or equal to the fuel pipe capacity (i.e., when it is determined that the air has been completely purged), the process proceeds to step S202 described above where fuel injection based on the normal mode, that is, fuel injection in the compression stroke, is executed (i.e., the air purge control ends).

Next, air purge control (i.e., a process for determining whether to execute air purge control after complete explosion and a process for determining whether to stop the air purge control after complete explosion (stoppage determination based on the fuel-pressure control state of the high-pressure fuel pump 60)) performed by the control apparatus 1 will be described with reference to FIG. 5. This process is similarly executed after the engine 10 is cranked and transitions from initial explosion to complete explosion.

In step S300, it is determined whether or not the fuel pressure is higher than or equal to a predetermined pressure. If the fuel pressure is higher than or equal to the predetermined pressure (i.e., if the fuel pressure is properly increased), the process proceeds to step S302. If the fuel pressure is below the predetermined pressure (i.e., if a pressurization failure occurs), the process proceeds to step S304.

In step S302, fuel injection based on the normal mode, that is, fuel injection in the compression stroke, is executed. Subsequently, this process temporarily ends.

In step S304, air purge control is executed. Specifically, a single injection process in the intake stroke of the engine 10 is executed. In that case, the fuel injection pulse width to be applied to the injectors 12 is expanded so that the fuel injection time of the injectors 12 is made longer than that in normal operation (i.e., when the fuel pressure is higher than or equal to the predetermined pressure).

Subsequently, in step S306, it is determined whether or not the actual fuel pressure is larger than or equal to a value obtained by subtracting a predetermined tolerance from a target fuel pressure and whether or not the actual fuel pressure is smaller than or equal to a value obtained by adding the predetermined tolerance to the target fuel pressure, that is, whether or not the difference between the actual fuel pressure and the target fuel pressure is within the predetermined tolerance. If the difference between the actual fuel pressure and the target fuel pressure is within the predetermined tolerance (i.e., if the fuel pressure is properly increased), the process proceeds to step S312. On the other hand, if the difference between the actual fuel pressure and the target fuel pressure is not within the predetermined tolerance, the process proceeds to step S308.

In step S308, it is determined whether or not an experience flag (which will be described in detail later) is set. If the experience flag is set, a value of a counter, which counts the time elapsed from when the difference between the actual fuel pressure and the target fuel pressure falls within the predetermined tolerance, is cleared (i.e. is set to "0") in step S310. Then, the process proceeds to step S304, and the process from step S304 and onward described above is executed again. On the other hand, if the experience flag is not set, the process directly proceeds to step S304 (without clearing the counter value), and the process from step S304 and onward described above is executed again.

In step S312, the value of the counter, which counts the time elapsed from when the difference between the actual fuel pressure and the target fuel pressure falls within the predetermined tolerance, is incremented by 1. Then, in step S314, the experience flag indicating that the counter value is incremented is set to "1".

Subsequently, in step S316, it is determined whether or not the counter value is larger than or equal to a predetermined value (i.e., whether or not a state where the difference between the actual fuel pressure and the target fuel pressure is within the predetermined tolerance (i.e., a state where the fuel pressure is properly increased) is continuing for a predetermined time or longer). If the counter value is larger than or equal to the predetermined value, the process proceeds to step S318. On the other hand, if the counter value is smaller than the predetermined value, the process proceeds to step S304, and the process from step S304 and onward described above is executed again.

In step S318, the value of the counter, which counts the time elapsed from when the difference between the actual fuel pressure and the target fuel pressure falls within the predetermined tolerance, is cleared (i.e. is set to "0"), and the experience flag indicating that the counter value is incremented is reset (i.e., set to "0"). Then, the process proceeds to step S302 described above where fuel injection based on the normal mode, that is, fuel injection in the compression stroke, is executed (i.e., the air purge control ends).

As described in detail above, in this example, if the fuel pressure is below the predetermined pressure when starting the engine 10, air purge control is executed so that fuel injection is performed in the intake stroke in which the cylinder pressure is low. Therefore, the fuel can be injected into the cylinders even in a condition where the fuel pressure is not increased to the requested level, due to inclusion of air, when the fuel is to be injected in the compression stroke (i.e., even in a case where a pressurization failure of fuel pressure occurs). As a result, the engine 10 can be prevented from being incapable of starting even if a pressurization failure of fuel pressure occurs due to inclusion of air when starting the engine 10.

According to this example, when air purge control is being executed, the fuel injection time of the injectors 12 is made longer than that during normal control. Thus, the fuel injection amount that decreases due to air mixing with the fuel is compensated for, thereby preventing misfire occurring as a result of a lean air-fuel ratio. Moreover, this can facilitate purging of air so that the air can be purged at an early stage.

Furthermore, according to this example, even if the fuel pressure falls below the predetermined pressure after the engine 10 transitions to complete explosion, air purge control is executed so that fuel injection is performed in the intake stroke of the engine 10. Therefore, even if a pressurization failure of fuel pressure occurs due to inclusion of air after complete explosion, the fuel can be injected into the cylinders. Consequently, when starting the engine 10, the engine 10 can be prevented from stalling after transitioning from initial explosion to complete explosion.

According to this example, when air purge control is being executed, if the amount of fuel in the fuel tank 63 is larger than or equal to the predetermined amount (i.e., when the fuel tank 63 is not in a so-called out-of-gas state) and the integrated value of the fuel injection amount (integrated injection amount) is larger than or equal to the predetermined value, it is determined that the air mixed in the fuel has been purged, and the air purge control can be properly stopped (terminated).

In that case, the aforementioned predetermined value is set in accordance with the capacity (fuel pipe capacity) of the components and pipes constituting the fuel feed system from the feed pump 64 to the injectors 12. Therefore, it can be accurately determined whether or not the air mixed in the fuel has been completely purged.

Furthermore, according to this example, when the state where the difference between the actual fuel pressure and the target fuel pressure is within the predetermined tolerance (i.e., the state where the fuel pressure is properly increased) continues for the predetermined time or longer, it is determined that the air mixed in the fuel has been purged, and the air purge control can be properly stopped (terminated).

As described above, according to this example, the engine 10 can be prevented from being incapable of starting even if a pressurization failure of fuel pressure occurs due to inclusion of air when starting the engine 10.

Although the example of the present invention has been described above, the present invention is not to be limited to the above-described example, and various modifications are possible. For instance, although two methods are described as processes for determining whether to stop air purge control in the above-described example, namely, the stoppage determination method based on the integrated fuel amount and the fuel pipe capacity (see the flowchart in FIG.

4) and the stoppage determination method based on the fuel-pressure control state of the high-pressure fuel pump 60 (see the flowchart in FIG. 5), only one of the two methods may be executed.

Furthermore, although the timekeeping process in the above-described example is performed by using the counter that counts the time elapsed from when the difference between the actual fuel pressure and the target fuel pressure falls within the predetermined tolerance, a timer may be used in place of the counter.

Furthermore, although the high-pressure fuel pump 60 described in the above-described example has the pump driving cam 601 provided with three cam lobes, the number of cam lobes of the pump driving cam 601 is not limited to three.

The invention claimed is:

1. A control apparatus for a direct injection engine, the control apparatus comprising:
 a fuel pressure detector that detects fuel pressure of fuel to be fed to at least one injector that injects the fuel into a corresponding cylinder of the engine; and
 a fuel injection controller that executes air purge control for performing fuel injection in an intake stroke of the engine if the fuel pressure detected by the fuel pressure detector is below a predetermined pressure when the engine starts.

2. The control apparatus for a direct injection engine according to claim 1,
 wherein when executing the air purge control, the fuel injection controller makes a fuel injection time of the injector longer than when the fuel pressure is higher than or equal to the predetermined pressure.

3. The control apparatus for a direct injection engine according to claim 1,
 wherein when executing the air purge control, the fuel injection controller performs a single injection process in the intake stroke.

4. The control apparatus for a direct injection engine according to claim 2,
 wherein when executing the air purge control, the fuel injection controller performs a single injection process in the intake stroke.

5. The control apparatus for a direct injection engine according to claim 1,
 wherein if the fuel pressure falls below the predetermined pressure after the engine is cranked and transitions from initial explosion to complete explosion, the fuel injection controller executes the air purge control.

6. The control apparatus for a direct injection engine according to claim 2,
 wherein if the fuel pressure falls below the predetermined pressure after the engine is cranked and transitions from initial explosion to complete explosion, the fuel injection controller executes the air purge control.

7. The control apparatus for a direct injection engine according to claim 3,
 wherein if the fuel pressure falls below the predetermined pressure after the engine is cranked and transitions from initial explosion to complete explosion, the fuel injection controller executes the air purge control.

8. The control apparatus for a direct injection engine according to claim 4,
 wherein if the fuel pressure falls below the predetermined pressure after the engine is cranked and transitions from initial explosion to complete explosion, the fuel injection controller executes the air purge control.

9. The control apparatus for a direct injection engine according to claim 1, further comprising:
 a fuel amount detector that detects an amount of fuel retained in a fuel tank; and
 an integrator that integrates a fuel injection amount since start of the fuel injection,
 wherein when executing the air purge control, if the amount of fuel detected by the fuel amount detector is larger than or equal to a predetermined amount and an integrated value of the fuel injection amount integrated by the integrator is larger than or equal to a predetermined value, the fuel injection controller stops the air purge control.

10. The control apparatus for a direct injection engine according to claim 2, further comprising:
 a fuel amount detector that detects an amount of fuel retained in a fuel tank; and
 an integrator that integrates a fuel injection amount since start of the fuel injection,
 wherein when executing the air purge control, if the amount of fuel detected by the fuel amount detector is larger than or equal to a predetermined amount and an integrated value of the fuel injection amount integrated by the integrator is larger than or equal to a predetermined value, the fuel injection controller stops the air purge control.

11. The control apparatus for a direct injection engine according to claim 3, further comprising:
 a fuel amount detector that detects an amount of fuel retained in a fuel tank; and
 an integrator that integrates a fuel injection amount since start of the fuel injection,
 wherein when executing the air purge control, if the amount of fuel detected by the fuel amount detector is larger than or equal to a predetermined amount and an integrated value of the fuel injection amount integrated by the integrator is larger than or equal to a predetermined value, the fuel injection controller stops the air purge control.

12. The control apparatus for a direct injection engine according to claim 4, further comprising:
 a fuel amount detector that detects an amount of fuel retained in a fuel tank; and
 an integrator that integrates a fuel injection amount since start of the fuel injection,
 wherein when executing the air purge control, if the amount of fuel detected by the fuel amount detector is larger than or equal to a predetermined amount and an integrated value of the fuel injection amount integrated by the integrator is larger than or equal to a predetermined value, the fuel injection controller stops the air purge control.

13. The control apparatus for a direct injection engine according to claim 9,
 wherein the predetermined value is set in accordance with a capacity of components and pipes constituting a fuel feed system from a low-pressure fuel pump, which suctions up the fuel retained in the fuel tank, to the injector.

14. The control apparatus for a direct injection engine according to claim 10,
 wherein the predetermined value is set in accordance with a capacity of components and pipes constituting a fuel feed system from a low-pressure fuel pump, which suctions up the fuel retained in the fuel tank, to the injector.

15. The control apparatus for a direct injection engine according to claim 11,
wherein the predetermined value is set in accordance with a capacity of components and pipes constituting a fuel feed system from a low-pressure fuel pump, which suctions up the fuel retained in the fuel tank, to the injector.

16. The control apparatus for a direct injection engine according to claim 12,
wherein the predetermined value is set in accordance with a capacity of components and pipes constituting a fuel feed system from a low-pressure fuel pump, which suctions up the fuel retained in the fuel tank, to the injector.

17. The control apparatus for a direct injection engine according to claim 1,
wherein when executing the air purge control, if a state where a difference between an actual fuel pressure detected by the fuel pressure detector and a fuel-pressure control target value is within a predetermined tolerance continues for a predetermined time or longer, the fuel injection controller stops the air purge control.

18. The control apparatus for a direct injection engine according to claim 2,
wherein when executing the air purge control, if a state where a difference between an actual fuel pressure detected by the fuel pressure detector and a fuel-pressure control target value is within a predetermined tolerance continues for a predetermined time or longer, the fuel injection controller stops the air purge control.

19. The control apparatus for a direct injection engine according to claim 3,
wherein when executing the air purge control, if a state where a difference between an actual fuel pressure detected by the fuel pressure detector and a fuel-pressure control target value is within a predetermined tolerance continues for a predetermined time or longer, the fuel injection controller stops the air purge control.

20. The control apparatus for a direct injection engine according to claim 4,
wherein when executing the air purge control, if a state where a difference between an actual fuel pressure detected by the fuel pressure detector and a fuel-pressure control target value is within a predetermined tolerance continues for a predetermined time or longer, the fuel injection controller stops the air purge control.

* * * * *